United States Patent [19]

Beffa et al.

[11] 4,085,097

[45] Apr. 18, 1978

[54] PROCESS FOR THE MANUFACTURE OF CHROMIUM COMPLEXES FROM METALLIZABLE AZO OR AZO METHINE DYES

[75] Inventors: Fabio Beffa, Riehen; Arthur Bühler, Rheinfelden, both of Switzerland; Peter Donath, Grenzach, Germany; Hans Ulrich Schütz, Basel, Switzerland; Gerhard Back, Lorrach, Germany

[73] Assignee: Ciba-Geigy AG, Basel, Switzerland

[21] Appl. No.: 647,268

[22] Filed: Jan. 7, 1976

Related U.S. Application Data

[63] Continuation of Ser. No. 427,276, Dec. 20, 1973, abandoned.

[30] Foreign Application Priority Data

Dec. 22, 1972  Switzerland .................. 18724/72
Nov. 30, 1973  Switzerland .................. 16848/73

[51] Int. Cl.² ............... C09B 45/06; C09B 45/34; C09B 45/48; C09B 55/00
[52] U.S. Cl. .................. 260/145 A; 260/145 B; 260/145 R; 260/145 C; 260/146 R; 260/146 D; 260/147; 260/148; 260/149; 260/150; 260/151; 260/429 C
[58] Field of Search ........... 260/145 R, 145 A, 145 B, 260/146 R, 146 D, 146 T, 147, 148, 149, 150, 151, 145 C, 429 C

[56] References Cited

U.S. PATENT DOCUMENTS

| | | | |
|---|---|---|---|
| 3,051,696 | 8/1962 | Dettwyler | 260/147 |
| 3,102,110 | 8/1963 | Schetty | 260/151 |
| 3,114,745 | 12/1963 | Lodge et al. | 260/147 |
| 3,169,951 | 2/1965 | Buehler et al. | 260/151 X |
| 3,356,671 | 12/1967 | Johnson et al. | 260/149 X |
| 3,398,132 | 8/1968 | Dehnert | 260/151 X |
| 3,399,186 | 8/1968 | Hosokawa et al. | 260/148 |
| 3,412,081 | 11/1968 | Ackermann | 260/151 X |
| 3,939,140 | 2/1976 | Meininger et al. | 260/145 B |

OTHER PUBLICATIONS

Kirk–Othmer, "Encyclopedia of Chemical Technology", 2nd Ed., vol. 2, pp. 846–849 & 856–858, (1963).
Weissberger, "Technique of Organic Chemistry", vol. IV, pp. 356–368, (1951).

*Primary Examiner*—Charles F. Warren
*Attorney, Agent, or Firm*—Edward McC. Roberts; Michael W. Glynn; Prabodh I. Almaula

[57] ABSTRACT

A process is described for the manufacture of chromium complexes of metallizable dyes in the form of solid dyestuff powders of low salt to salt-free content, or of concentrated solutions of low salt or salt-free content in which a metallizable dye, or a mixture of metallizable dyes, in an organic solvent which is immiscible or sparingly miscible with water, or reacted with a chromium compound, in the course of which any water which is liberated is removed by azeotropic distillation, and the resulting chromium complex, provided it is a 1:1 complex, is then optionally reacted in the presence of a base with a further mol of a metallizable dye, or of a colorless, complexforming compound, then isolated from undissolved constituents, and the resulting dye solution of low salt or salt-free content is optionally concentrated or evaporated to dryness, whereby it is possible the manufacture of 1:1 or 1:2 chromium complexes without the handicap of effluent pollution, and to isolate the dyes without using salt. The dyes obtained are especially suitable for the manufacture of concentrated solutions without the necessity of having to increase the solubility by means of extenders.

4 Claims, No Drawings

PROCESS FOR THE MANUFACTURE OF CHROMIUM COMPLEXES FROM METALLIZABLE AZO OR AZO METHINE DYES

This is a continuation of application Ser. No. 427,276, filed on Dec. 20, 1973, now abandoned.

The manufacture of chromium complexes from metallisable dyes by the existing conventional methods presents with respect to effluent purification a number of problems the solution of which demands considerable expenditure. The conventional chroming methods are unsatisfactory in the following respects:
- the use of a substantial surplus of chromium
- the use of complexing agents, e.g. salicylic acid, in chroming operations in alkaline medium
- the use of large amounts of common salt in isolating the complexes.

A particular disadvantage is that the chromium complexes obtained and isolated by the known methods always contain greater or lesser amounts of inorganic salts. This is convenient both in the manufacture of liquid concentrated dyestuff preparations and in that of preparations in powder form, because the salt reduces the solubility. A process has now been discovered which enables chromium complexes to be manufactured from metallisable dyes, e.g. azomethine and azo dyes, using just the stoichiometric amount of chromium salts or only a small surplus thereof, in the form of concentrated solutions which have a low salt content or are virtually free from salt, and which can be used direct as dyestuff preparations or converted into practically salt-free powders. Naturally, it is preferable to carry out the process with the exact stoichiometric amount of chromium, but a possible shortfall or surplus does not in general have any detrimental effect on the course of the reaction. Excess chromium compounds are removed from the solution by means of the filtration carried out in alkaline medium. According to the present invention, there are obtained solutions and preparations of chromium complex dyes which, in addition to the metal bonded as a complex, contain no further metal compounds. Consequently, the dyebaths contain no further chromium salts apart from the cited complex dyes, which is of very great advantage to the consumer as regards effluent.

The invention therefore provides a process for the manufacture of chromium complexes from metallisable dyes in the form of solid dye powders of low salt or salt-free content, or of concentrated solutions of low salt or salt-free content, wherein a metallisable dye or a mixture of metallisable dyes, in dry or paste form in an organic solvent which is immiscible or sparingly miscible with water, is reacted with a chromium compound, in the course of which any water which is liberated is removed by azeotropic distillation, and the resulting chromium complex, provided it is a 1:1 complex, is subsequently reacted in the presence of a base with a further mol of a metallisable dye, or of a colourless, complex forming compound, then isolated from undissolved constituents, and the resulting dyestuff solution of low salt or salt-free content is optionally concentrated or evaporated to dryness. Preferably, water from the chroming mixture is removed by azeotropic distillation until the solubility limit of the water in the organic solvent is attained. This process yields ordinarily first the 1:1 chromium complexes, since the first step is preferably carried out in acid solution. The dye used can itself act as an acid if it contains acid groups, e.g. sulpho groups. But the acid can also be provided by the chromium compound used, e.g. $CrCl_3.6H_2O$, or an acid is added to the reaction mixture, e.g. hydrochloric acid, hydrofluoric acid, acetic acid, or formic acid.

The resulting 1:1 chromium complex in concentrated solution can be isolated by evaporation — e.g. preferably after neutralisation — or can be further reacted without first being isolated.

It is possible to react it, for example, in known manner with a further mol of the same or of a different complex forming dye and to obtain in this way symmetric or assymmetric 1:2 chromium complexes.

Symmetric 1:2 chromium complexes are manufactured by starting, according to choice, direct from a chromium/dye ratio of 1:2, or a start is made from a ratio of 1:1, and, after the manufacture of the 1:1 complex, a second equivalent of dye is added. It is furthermore also possible to manufacture 1:2 chromium complexes in one step by adding from the outset a base to the reaction mixture consisting of 2 equivalents of dye and 1 equivalent of chromium.

Asymmetric 1:2 chromium complexes can also be obtained by starting from a mixture of two or more complex forming dyes. It depends on the constitution of the chosen dyes whether from a mixture of one equivalent of each of two dyes there are obtained in this way a homogeneous asymmetric 1:2 complex or a mixture thereof with the two possible symmetric complexes The safer, and therefore preferred, method of obtaining homogeneous, asymmetric salt-free 1:2 chromium complexes consequently consists in reacting a metallisable dye in acid medium with one equivalent of a chromium compound, in the course of which the water is removed by azeotropic distillation, the adding to the resulting 1:1 chromium complex a second equivalent of another metallisable dye while raising the pH, in the course of which, if necessary, water is once more distilled off azeotropically, and isolating the product from any inorganic salts which have been formed.

Instead of reacting the 1:1 chromium complex obtained according to the invention in acid solution with a second mol of dye, it is possible to react it with a colourless, complex forming compound, e.g. salicyclic acid, 1,2-dihydroxybenzene, 8-hydroxy-quinoline, 8-hydroxy-quinoline-5- and -7-sulphonic acid, oxalic acid, 2-hydroxyethylamine etc.

As base there is used, for example, a carbonate, hydrogen carbonate, acetate or hydroxide of an alkali or alkaline earth, in some cases also ammonia or amines. Further, the solutions of chromium complex salts obtained according to the process of the invention for increasing the solubility without prior isolation can be used for the manufacture of solvent dyes (alcohol-soluble dye salts), e.g. suitable amine salts. The 1:1 or 1:2 chromium complex, e.g. in the form of its sodium salt, is converted in this case into an amine salt by addition of a suitable amine. Examples of suitable amines are quanidine, dicyclohexylamine, aminoalkyl-polyalkyl-polyhydrophenanthrene, in particular the compounds cited in British patent No. 1.120.489 or the compounds described in Belgian patent No. 787.351, of the formula

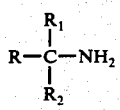

wherein R, $R_1$ and $R_2$ represent alkyl radicals with together 10 to 24 carbon atoms.

Suitable organic solvents for the process according to the invention are above all those whose boiling point is between 80° C and 180° C, preferably between 110° C and 140° C, and which form a mixture gap in the appropriate range so that, on the one hand, the chroming can be carried out at the required temperature, and as far as possible without pressur apparatus, and on the other hand, the dye can be freed from the solvent under mild conditions. Such solvents are, for example, univalent alcohols with 4 to 6 carbon atoms, hydrocarbons with 7 to 10 carbon atoms, aliphatic ketones, alkyl esters of alkane acids with up to 5 carbon atoms, aliphatic ethers with 6 to 10 carbon atoms. As examples of such solvents there may be cited: 3-pentanol, 2-methyl-heptane, 3,4-dimethylhexane, isovaleric acid methyl ester, n-butanol, cycloheptane, 4-methylheptane, sec. butyl methyl ketone, 3-ethylhexane, methyl isobutyl ketone, 3-acetyl-3-methylpentane, amyl ether, 2-pentanol, 2-methyl-4-penten-2-ol, 2,3-dimethylbutanol, sec. butyl ether, 1,3-dimethylcyclohexane, 3,3-dimethylbutanol, 3-penten-2-one, propionic acid propyl ester, 3-methylheptane, isobutyl ether, 3-methylpentanol, octylene, formic acid isoamyl ester, 2,4-dimethylpentanone-3, 3-hexanone, n-octane, butyl methyl ketone, 2-methyl-pentanol-3, 2-methylbutanol-1, triethyl phosphate, 5-hexen-2-one, n-hexanol, cyclohexanone.

The chroming is effected by methods which are known per se with the chromium compounds ordinarily used for the purpose and at the customary temperatures and pH conditions. Suitable therefore are salts or complexes of trivalent chromium; particularly advantageous, however, are chromium-(III) chloride or chromium-(III) fluoride and chromium-(III)oxide hydrate in the presence of hydrochloric or hydrofluoric acid. Trivalent chromium can also be produced in situ. Thus also chromium-VI compounds are also possible as chroming agents, e.g. chromates. These are used in the presence of e.g. hydrochloric acid and a reducing agent, e.g. an alcohol. Conventional reducing agents are e.g. glycolic acid or butanol.

Examples of suitable metallisable dyes are the known o,o'-dihydroxyazo, o-hydroxy-o'-aminoazo, o-carboxy-o'-hydroxyazo or o-carboxy-o'-aminoazo dyes which can also be used for the manufacture of chromium complexes by the conventional methods. Instead of a hydroxy group in the ortho-position, the azo dyes can also contain a low molecular alkoxy group, in particular a methoxy group. They can carry sulpho, sulphonamido or sulphone groups, and furthermore can be substituted by the customary non-iogenic substituents of azo dyes, e.g. by fluorine, chlorine, nitro, low molecular alkyl or alkoxy groups, aryl, in particular phenyl, and by phenyl radicals which are substituted by chlorine, sulpho groups, or low molecular alkyl, low molecular alkanoylamine, alkoxycarbonylamino or benzoylamino radicals, as well as by carbalkoxy or cyano groups. The term "low molecular" is to be understood as meaning herein radicals with 1 to 4 carbon atoms.

Such azo dyes are obtained e.g. from the following diazo and coupling components:

diazo components:

2-amino-4-chlorophenol
2-amino-4-nitrophenol
2-aminophenol-4,6-disulphonic acid
2-aminophenol-4-nitro-6-sulphonic acid
2-aminophenol-6-nitro-4-sulphonic acid
2-amino-5-nitrophenol
1-amino-2-methoxy-5-chlorobenze
1-amino-2-hydroxy-4-sulphonaphthalene
1-amino-2-hydroxy-4-sulpho-6-nitronaphthalene
2-amino-4-methoxy-5-chlorophenol
2-amino-4-sulphonamidophenol and N-substituted derivatives thereof
2-amino-4,6-dinitrophenol
2-amino-4-sulpho-benzoic acid
anthranilic acid
2-amino-5-sulphonamidobenzoic acid
2-amino-6-nitro-4-tert. amyl-phenol
2-aminophenol-4-methylsulphone
5-nitro-2-aminophenol-4-methylsulphone
2-aminophenol-4- or -5-(2'-carboxyphenylsulphamide)
4-hydroxy-3-amino-azobenzene
3-methoxy-4-amino-azobenzene
4-hydroxy-3-amino-2'-methoxy-azobenzene coupling components 1-hydroxynaphthalene-3,6,8-trisulphonic acid
1-hydroxynaphthalene-5-sulphonic acid
1-hydroxynaphthalene-4-sulphonic acid
1-hydroxynaphthalene-8-sulphonic acid
1-hydroxynaphthalene-3,6-disulphonic acid
2-naphthol
2-naphthol-6,8-disulphonic acid
5,8-dichloro-nephthol-(1)
m-phenylenediamine-4-sulphonic acid
2-naphthol-6-sulphonamide or N-substituted products thereof
1-phenyl-3-methyl-pyrazolone-(5)
1-(3'-sulphonamidophenyl)-3-methyl-pyrazolone-(5)
1-(3'-chlorophenyl)-3-methyl-pyrazolone-(5)
1-(3'-sulphophenyl-3-methyl-pyrazolone-(5)
acetoacetic anilide
barbituric acid
pyridones which couple in ortho-position to a hydroxy group
2,4-dioxy-quinoline
3-methoxy-dialkyl aniline
4-methylnaphthol Chromium complexes of azo dyes for the manufacture of which the process according to the invention is suitable are further described in German Auslegeschrift No. 1.008.254 and in British patents Nos. 981.349, 1.001.717, 986.655, 1.001.840, 1.040.557, 964.800, 776.168, 727.535, 775.005, 762.905, 762.905, 774.884, 812.151, 838.791, 851.861, 1.120.489, and 1.201.560.

Suitable azomethine dyes are above all those with the structure of the formula

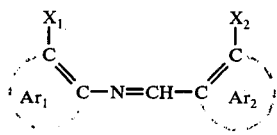

wherein $Ar_1$ and $Ar_2$ each represents an aromatic ring, in particular a benzene or naphthalene ring, and $X_1$ and $X_2$ represents OH groups; but $X_1$ can also be a carboxy group.

Azomethine dyes from which it is possible to manufacture chromium complexes by the process according to the invention, are described e.g. in French patents Nos. 1.203.570 and 1.098.839 and in Swiss patent No. 331856.

Furthermore, it is also possible to manufacture chromium complexes of triazole dyes by the process according to the invention, for example the compounds described in German Offenlegungsschrift No. 1,964,148. The process is also suitable for the chroming of dyes which contain a salicylic acid group, such as azo dyes or triphenylmethane dyes. The tricyclic chromium complexes described in German Offenlegungsschrift No. 1,061,922 can also be manufacture by the new process.

Since the dyestuff solutions obtained according to the invention have a low water content or contain virtually no water, any inorganic salts present during the reaction can be isolated. The isolation of the inorganic salts is effected by the conventional methods, e.g. by filtration using a single or multi-layer filter, by suction filtration on a stirred pressure filter, or by centrifuging with the various kinds of centrifuge. Depending on the choice of the appropriate apparatus, it is advisable to filter the solution through a fine clarifying filter. The practically salt-free solutions of 1:1 or 1:2 chromium complexes obtained in this way are used direct as dyestuff preparations or are slightly evaporated to concentrated solutions or are subjected to drying (spray drying or paddle drying).

Industrial importance attaches moreover to the possibility of being able at any stage of the processing to add the assistants and extenders necessary for specific commercial products to the solutions of low salt content obtained according to the invention. Very homogeneous preparations are obtained in this way and no compounding operations of solid substances are necessary. As additives it is possible to admix e.g. dust removers, defoamers, dispersants, wetting agents, printing paste additives, explosives, and toning dyestuffs. Already in the stage of the low salt content solution or paste it is also possible to admix the assistants or additives which are necessary for the manufacture of dyestuff granules or foams and which improve the solubility in cold water. The manufacture of commercial ready for use dyestuff preparations is not only simplified by the virtually salt-free solutions obtained by the process according to the invention, but these preparations are also very readily reproducible since the dye is as good as pure and is processed not already mixed with salts.

The distinguishing feature of the new process is that it makes possible the manufacture of 1:1 or 1:2 chromium complexes without the handicap of effluent pollution. The solvents employed can be regenerated and reused. A further advantage resides in the fact that it is possible to isolate the dyes without using salt and that the inorganic salts which are formed during the manufacture can be isolated in simple manner, i.e. by filtration, due to the virtually anhydrous mode of operation. The practically salt-free dyes are characterised by a surprisingly high solubility which surpasses that of the products which are manufactured in conventional manner in the presence of water. The dyes according to the invention are therefore especially suitable for the manufacture of concentrated solutions without the necessity of having to increase the solubility by means of extenders (e.g. dextrin).

The following Examples illustrate the invention, the parts and percentages being by weight unless otherwise stated.

EXAMPLE 1

42.4 parts of the dye of the formula

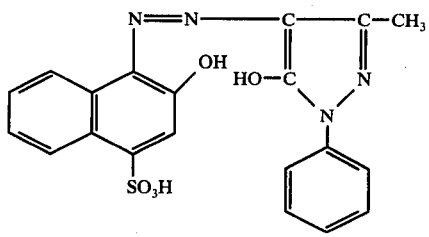

are boiled for 30 to 60 minutes in a mixture of 500 parts by volume of n-butanol, an amount of chromium hydroxide containing 5.2 parts of chromium, and 20 parts by volume of 30% hydrochloric acid, in the process of which the water is removed by azeotropic distillation. The dark red dye solution is filtered free of inorganic salts and evaporated to dryness, yielding a dark red dyestuff powder which contains no further metal compounds apart from the metal bonded as a complex. The dye dissolves to give a red solution in water with the addition of sodium carbonate and from an acid bath dyes wool in pink shades with very good fastness properties.

EXAMPLE 2

38.9 parts of the monoazo dye of the formula

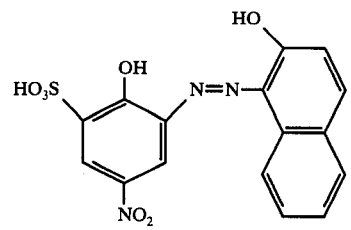

in the form of a moist paste are stirred for 1 to 2 hours at 105°–115° C in 400 parts by volume of n-butanol and 26.6 parts of $CrCl_3.6H_2O$, in the course of which the water which has formed is removed by azeotropic distillation. The resulting dye solution is treated with 20 parts of sodium carbonate, stirred for 10 minutes, filtered, and evaporated to dryness. The resulting dye in the form of a very readily water-soluble dark powder dyes wool from a sulphuric acid bath in deep violet-brown shades of a very good levelness and generally good wet fastness properties. The residual effluent contains no metal compounds apart from a small amount of non-fixed dye.

The same dye is obtained in the same purity by substituting an equivalent amount of chromium fluoride for the indicated amount of chromium chloride hexahydrate in the above Example.

EXAMPLE 3

43.9 parts of the monoazo dye of the formula

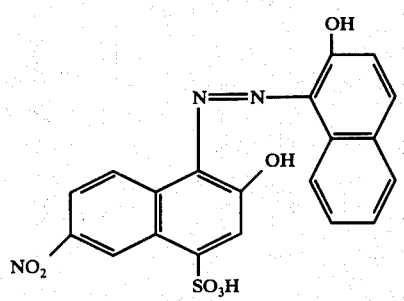

are chromed in accordance with Example 2. Upon addition of 33.9 parts of the monoazo dye of the formula

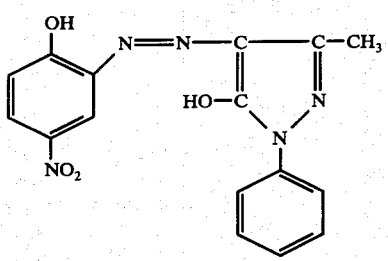

and 30 parts of sodium carbonate, the reaction mixture is stirred for 1-2 hours at 110°-115° C while likewise removing the water by azeotropic distillation. When the reaction is terminated, the mixture is filtered free of inorganic salts and evaporated to dryness, yielding a practically salt-free, dark brown powder which gives a brown solution in water and from a weak acid bath dyes wool or leather in dark brown shades of good fastness properties.

EXAMPLE 4

40.65 parts of the monoazo dye of the formula

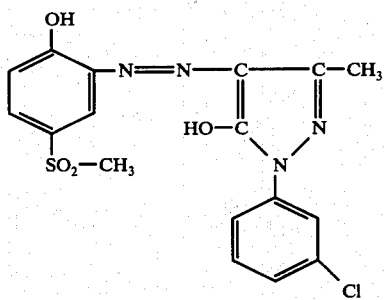

are dissolved in 400 parts of methyl isobutyl ketone. Upon addition of 26.65 parts of CrCl$_3$.6H$_2$O, the mixture is stirred for 1-2 hours at 105°-117° C in the course of which the water that forms is removed by azeotropic distillation. To the dye solution are then added 30 parts of sodium carbonate and a further 40.65 parts of the same monoazo dye and stirring is continued for a further 1-2 hours at 110° - 117° C. Upon termination of the reaction, the reaction mixture is filtered and the dye solution evaporated to dryness, to yield a reddish yellow powder which dissolves extremely well in water to give an orange solution and from a weak acid bath dyes wool in orange shades which are very fast to wet treatments and light. The residual effluent contains no metal compounds apart from the small amount of non-fixed chromium complex dye.

A tinctorially valuable orange lake dye is obtained by adding, upon termination of the reaction, a solution of 1 equivalent of Rosamin D in methyl isobutyl ketone, weakly acidifying the mixture with hydrochloric acid, filtering off the precipitated sodium chloride and evaporating the filtrate to dryness.

EXAMPLE 5

33.9 parts of the monoazo dye of the formula

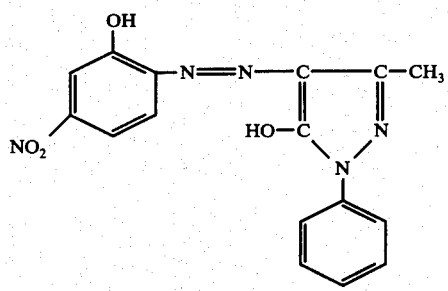

in a mixture of 250 parts by volume of n-hexanol, 30 parts of sodium carbonate and 13.3 parts of CrCl$_3$.6H$_2$O are heated to the boil, in the course of which the water which forms is distilled off by azeotropic distillation. Upon completion of the chroming (1:2 chromium complex), the reaction mixture is filtered, the clear filtrate treated with 2 g of a dispersant, and the filtrate evaporated to dryness, to yield a dark red powder which contains no further metal compounds apart from the metal bonded as a complex and which is applied as a finely ground preparation. It produces on nylon a dark red dyeing with good fastness properties.

EXAMPLE 6

39.4 parts of the monoazo dye of the formula

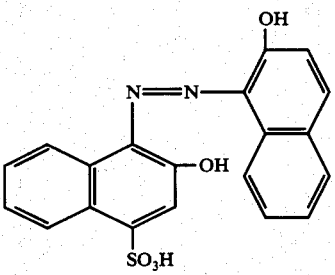

are chromed in accordance with Example 2, in the process of which the water is removed by azeotropic distillation. Upon addition of 39.8 parts of the disazo dye of the formula

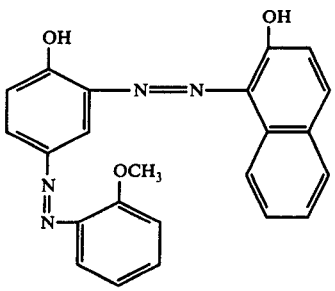

and 30 parts of sodium carbonate, the reaction mixture is stirred for 1-2 hours at 105°-110° C. After termination of the addition and filtration to remove inorganic salts, the reaction product is isolated by evaporation to yield a black powder which dissolves in water to give a greyish-black solution and dyes wool, nylon and leather in very fast, bloomy black shades.

EXAMPLE 7

33.9 parts of the monoazo dye of the formula

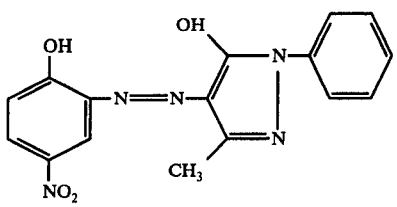

are converted into the 1:1 chromium complex according to the particulars of Examples 2.

Upon addition of 32.2 parts of the monoazo dye of the formula

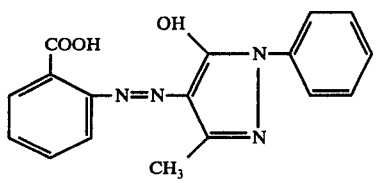

and of 24 parts of sodium carbonate, the reaction mixture is stirred for 1-2 hours at 112°-117° C again accompanied by azeotropic water separation. When the reaction is terminated, undissolved material is filtered off and the filtrate evaporated to yield a virtually salt-free brown powder which contains no further chromium compounds apart from the chromium bonded as a complex. The dye dyes wool from a slightly acid bath in pure, deep, orange shades of good fastness properties. To be highlighted are the good reserve properties of this dye: codyed effect threads of triacetate, terylene or acetate silk remain practically white, which is an indication of the high homogenity of this mixed complex.

EXAMPLE 8

40.85 parts of the monoazo dye of the formula

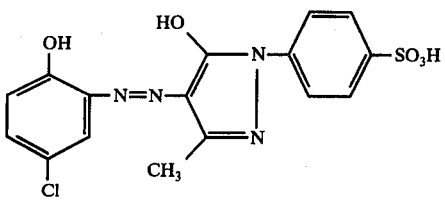

in the form of the filter cake are added to a mixture of 400 parts by volume of n-butanol and 26.6 parts of $CrCl_3.6H_2O$. Accompanied by azeotropic separation of the water of reaction, the batch is heated to 115°-117° C until the starting dye has been completely converted into the 1:1 chromium complex. Upon addition of 36.7 parts of the monoazo dye of the formula

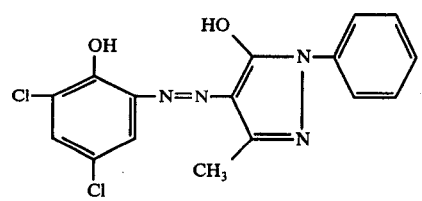

and 30 parts of anhydrous sodium carbonate, the reaction mixture is stirred for a further 2 hours at 115°-117° C accompanied by azeotropic separation of the water of reaction. After termination of the reaction, the mixture is filtered free of inorganic salts and the filtrate is evaporated to dryness. The virtually salt-free dye is obtained as a brownish red, readily watersoluble powder. It dyes wool or polyamide fibres from a weak acid bath in full, fast red shades.

EXAMPLE 9

A dye which dyes wool, polyamide fibres or leather from a weak acid bath in fast, reddish brown shades is obtained by converting 41.9 parts of the monoazo dye of the formula

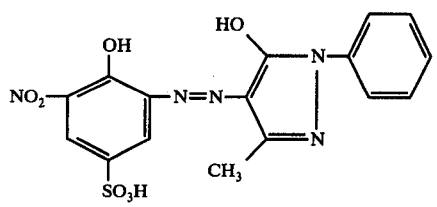

into the 1:1 chromium complex according to the particulars of the preceding Example, subsequently reacting it in the usual way with 33.4 parts of the monoazo dye of the formula

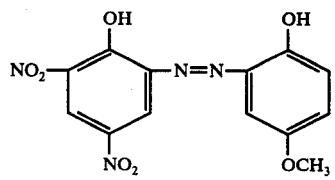

to give the homogeneous mixed complex, and processing as described in Example 8.

EXAMPLE 10

41.9 parts of the monoazo dye of the formula

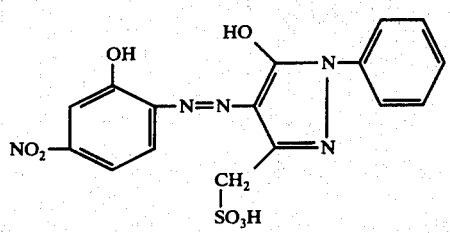

are converted into the corresponding 1:1 chromium complex according to the particulars of the preceding Example and subsequently reacted in the usual way with 33.9 parts of the monoazo dye of the formula

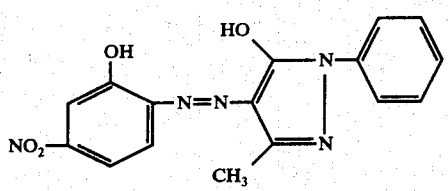

to give the homogeneous mixed complex. Processing as described in Example 8 yields a practically salt-free dye which from a weak acid bath dyes wool or polyamide fibres in bluish red shades which are fast to wet treatments and light.

EXAMPLE 11

14.9 parts of $Na_2Cr_2O_7.2H_2O$ are dissolved in 20 parts of water and the solution is added to 400 parts by volume of n-butanol. The orange-yellow solution is gradually treated, with stirring, with 80 parts by volume of 36% hydrochloric acid, in the course of which reduction of the bichromate anion to the trivalent chromium ion rapidly takes place accompanied by a rise in temperature to about 40° C and change of colour to green. After the exothermic reaction has subsided, 39.4 parts of the monoazo dye of the formula

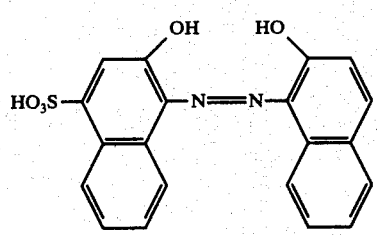

are added. Accompanied by removal of the water of reaction by azeotropic distillation, the mixture is subsequently heated to 115°–117° C until the above monoazo dye has been converted completely into the 1:1 chromium complex. By subsequently carrying out reaction according to the particulars of the preceding Example with 29.4 parts of the monoazo dye of the formula

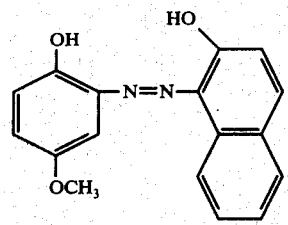

in the presence of 30 parts of anhydrous sodium carbonate, there is formed a readily water-soluble mixed complex which dyes wool and polyamide fibers from a weak acid bath in full, dark blue shades which are fast to wet treatments and light.

EXAMPLE 12

31.25 parts of the monoazo dye of the formula

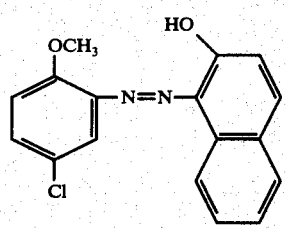

and 26.6 parts of $CrCl_3.6H_2O$ are added with stirring to 400 parts by volume of n-amyl alcohol. Accompanied by separation of the water of reaction by azeotropic distillation, the red reaction mixture is subsequently heated to 138°–142° C until the dealkylating metallising to the violet 1:1 chromium complex is terminated.

After the temperature has fallen to 110° C, 39.4 parts of the monoazo dye of the formula

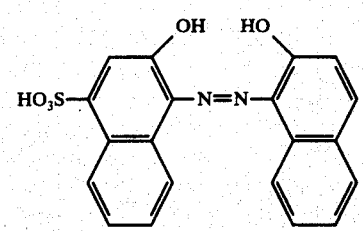

and 30 parts of anhydrous sodium carbonate are added and the batch is stirred for 2 hours at 110° C. Processing according to the particulars of the preceding Examples yields a dye which dyes wool, polyamide fibres and leather from a weak acid bath in full, dark violet shades.

EXAMPLE 13

42.25 parts of the monoazo dye of the formula

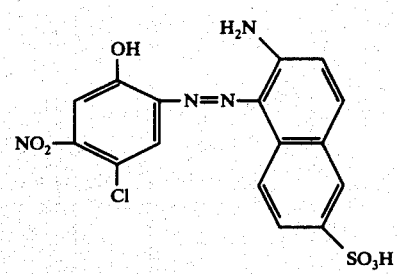

in the form of the filter cake are stirred with 400 parts by volume of n-butanol. Upon addition of 26.6 parts of CrCl$_3$.6H$_2$O, the mixture is heated for 6 hours to 115°–117° C accompanied by azeotropic separation of the water of reaction. During this time, the orange-red starting dye has been completely converted into the bluish green 1:1 chromium complex.

16 parts of 8-hydroxyquinoline and 30 parts by volume of a 30% sodium hydroxide solution are added and the reaction mixture is then stirred for 1 hour at 115°–117° C, subsequently freed from inorganic salts by filtration, and evaporated. The new, readily water-soluble dye of low salt content, which contains no further chromium compounds apart from the chromium bonded as a complex, dyes wool or polyamide fibres from a weak acid bath in pure, bluishgreen shades of good fastness properties.

A similarly valuable green dye is obtained by using 36.75 parts of the monoazo dye of the formula

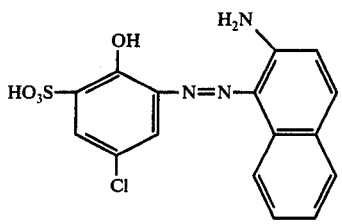

instead of the above mentioned azo dye and otherwise carrying out the same procedure.

EXAMPLE 14

According to the particulars of the preceding Example, 50.6 parts of the monoazo dye of the formula

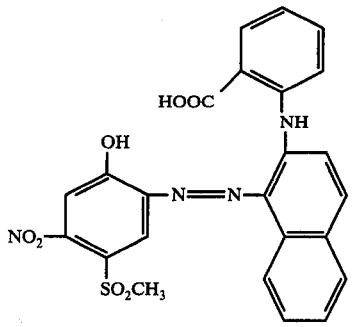

are converted into the corresponding 1:1 chromium complex and subsequently reacted with 16 parts of 8-hydroxyquinoline, to give the mixed complex. The resulting dye produces on wool or polyamide fibres from a weak acid bath pure, level green dyeings of very good fastness properties.

EXAMPLE 15

32.2 parts of the monoazo dye of the formula

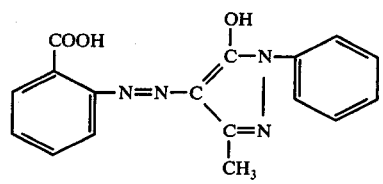

are stirred for 1–2 hours at 105°–116° C in a mixture of 600 parts by volume of methyl isobutyl ketone and 26.6 parts of CrCl$_3$.6H$_2$O, in the course of which the water which forms is removed by azeotropic distillation. The resulting dye solution is treated with 32.2 parts of the same monazo dye and 20 parts by volume of concentrated ammonia. The reaction mixture is then stirred for 1–2 hours at 105°–117° C, also accompanied by azeotropic separation of the water and evaporated do dryness upon completion of the reaction. A brownish yellow powder is obtained which dissolves in water to give a yellow solution and dyes wool and polyamide material in very fast yellow shades. The same dye, which contains no further metal compounds apart from the metal bonded as a complex, is obtained by using in the above Example 15 g of anhydrous sodium carbonate instead of 20 parts by volume of ammonia and otherwise carrying out the process as described in the Example.

EXAMPLE 16

43.9 parts of the monoazo dye of the formula

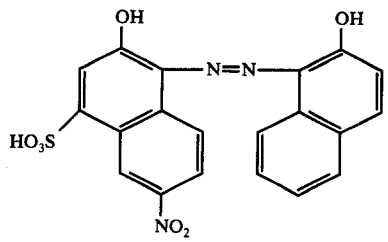

are stirred for 1–2 hours at 105°–115° C in a mixture of 500 parts by volume of n-butanol and 26.6 parts of CrCl$_3$.6H$_2$O, the water which forms being removed by azeotropic distillation. The resulting dye solution is treated with 43.9 parts of the same monoazo dye and 30 parts of sodium carbonate. The reaction mixture is then stirred for 1–2 hours at 110°–115° C, also accompanied by azeotropic separation of the water, filtered free from inorganic salts upon completion of the reaction and evaporated to dryness.

A virtually salt-free black powder is obtained which dissolves in water to give a black solution and dyes wool or leather from a weak acid bath, optionally in the presence of levelling agents, in black shades of good fastness properties.

The same (1:2) chromium complex dye is obtained in equally good quality by substituting in the above Example 20 parts by volume of concentrated ammonia for the indicated amount of sodium carbonat.

EXAMPLE 17

81.50 parts of the monoazo dye of the formula

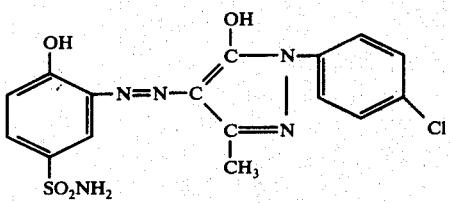

are dissolved in 600 parts of methyl isobutyl ketone. 26.6 parts of chromium chloride hexahydrate are added and then the mixture is stirred for 1–2 hours at 105°–117° C, in the course of which the water which forms is removed by azeotropic distillation. The dye solution is then treated with 30 parts of sodium carbonate and stirring is continued for a further 1–2 hours at 110°–117° C. When the reaction is terminated, the reaction mixture is filtered and the dye solution evaporated to dryness to yield an orange-brown powder which dissolves extremely well in water and from a neutral to weak acid bath dyes wool in orange shades which are very fast to wet treatments and light.

EXAMPLE 18

39.4 parts of the dye of the formula

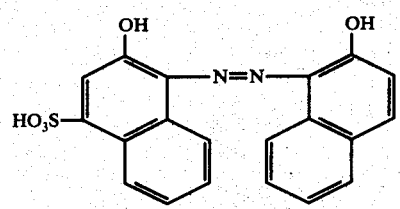

are stirred for 1–2 hours at 105°–115° C in a mixture of 500 parts by volume of n-butanol and 26.6 parts of CrCl$_3$.6H$_2$O, and the water which forms is separated by azeotropic distillation. The resulting dye solution is treated with 20 parts of sodium carbonate, 15.4 parts of 4-nitro-2-amino-1-hydroxybenzene and 22.6 parts of 4-hydroxy-3-formyl-1,1-azobenzene and stirring is continued for 1–2 hours at 70°–80° C. The reaction mixture is then filtered and the dye solution evaporated to dryness, to yield a dark powder which contains no further metal compounds apart from the metal bonded as a complex and which dissolves extremely well in water to give an olive coloured solution. The dye dyes wool or polyamide from a neutral to weak acid bath in olive shades with good fastness properties.

EXAMPLE 19

30.6 parts of a mixture of the monoazo dyes of the formula

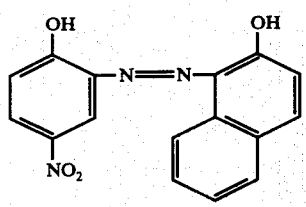

A

-continued

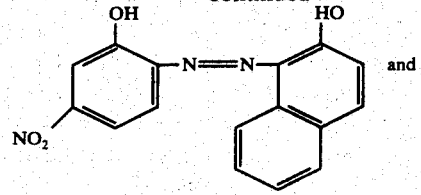

B and

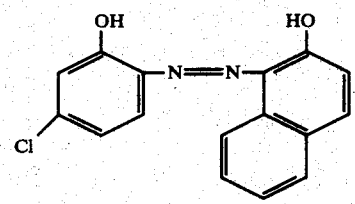

C in the ratio 9:12:10 are suspended in the moist state in 400 parts of methyl isobutyl ketone. After azeotropic distillation to remove the water, 13.3 parts of CrCl$_3$.6H$_2$O are added at 105° C. The water of crystallisation is again removed by distillation until a temperature of 115° C is attained.

Above the various stereoisomeric 1:1 chromium complexes of the dye A, B, and C there forms already in weak acid medium a mixture of the 6 different 2:1 complexes. Their amine salts are subsequently manufactured by addition of the equivalent amount of a solution of Primene-81-R in methyl isobutyl ketone. Compared with chemically identical products which were manufactured by other processes, the product obtained after filtration and distilling off the ketone is characterised above all by improved solubility in lower alkanols, with a substantially smaller recrystallisation tendency. The insoluble residue in acetone is constantly below 0.5%, thus making possible the specific use in the printing ink sectore.

EXAMPLE 20

37.5 parts of the monoazo dye of the formula

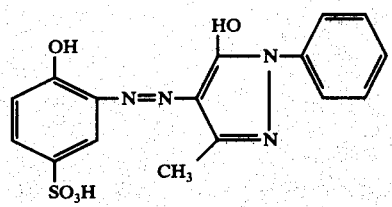

are chromed in accordance with Example 2.

36.8 parts of the disazo of the formula

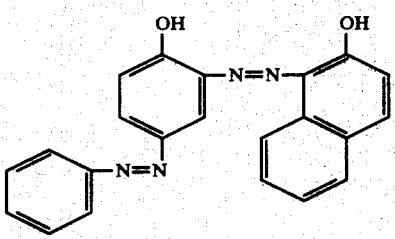

and 15 parts of sodium carbonate are added and then water is again removed by azeotropic distillation until a temperature of 108° C is attained. The filtered solution of the reaction product is evaporated to dryness in a paddle drier to yield a product which produces dark brown shades on wool and polyamide and whose solubility in water is 10 g/l.

Addition of 2 g of a solution or suspension of a formaldehyde condensation product in water at the conclusion of the distillation and subsequent drying of the mixture in a paddle drier yields a brownish black powder which produces dark brown shades on wool and polyamide and whose solubility is 50 g/l.

EXAMPLE 21

38.9 parts of the monoazo dye, 5-nitro-2-amino-1-oxybenzene→1-naphthol-4-sulphonic acid, are boiled for 15 hours at 105°–117° C in 500 parts by volume of n-butanol and an amount of $CrCl_3.6H_2O$ which contains 5.2 parts of chromium, in the process of which the sulphonic acid group is split off and the water which forms is removed by azeotropic distillation. To the dark blue solution are added a further 38.9 parts of the same monoazo dye and 30 parts of sodium carbonate and boiling is continued for a further 6 hours at 105°–115° C. The dark blue dye solution is filtered free of inorganic salts and evaporated to dryness, to yield a black powder which dissolves in water to give a blue solution and dyes wool or polyamide from a weak acid bath in dark blue shades of very good fastness properties.

We claim:

1. In a process of preparing a 1:1- or 1:2-chromium complex of a chromatable o-hydroxy-o'-(hydroxy or carboxy) azomethine or o-hydroxy-o'-(hydroxy, methoxy, amino or carboxy) azo dye by reacting said dye with a chroming agent with the liberation of water and the formation of inorganic salts, the improvement comprising carrying out the chroming reaction in the presence of a water insoluble or sparingly soluble organic solvent capable of forming an azeotrope with water, having a boiling point between 80° and 180° C and selected from the group consisting of alcohols with 4 to 6 carbon atoms and aliphatic ketones of up to 8 carbon atoms, removing water from the reaction mixture by azeotropically distilling said reaction mixture, and separating precipitated inorganic salts from the azeotropically distilled reaction mixture to obtain a substantially salt-free organic solution of said complex.

2. The process according to claim 1, wherein the chroming agent is selected from the group consisting of
    (a) chromium-(III) chloride hexahydrate;
    (b) a mixture of chromium-(III) oxide or hydroxide and hydrochloric or hydrofluoric acid; and
    (c) a mixture of sodium dichromate, hydrochloric acid and glycolic acid or butanol.

3. A process according to claim 2, wherein a stoichiometric amount of chroming agent is used.

4. A process according to claim 3, wherein the solvents are selected from the group consisting of n-butanol, amyl alcohol and methyl isobutyl ketone.

* * * * *